(No Model.)
E. R. KEEN.
DEVICE FOR ATOMIZING OR SPRAYING LIQUIDS.
No. 475,452. Patented May 24, 1892.
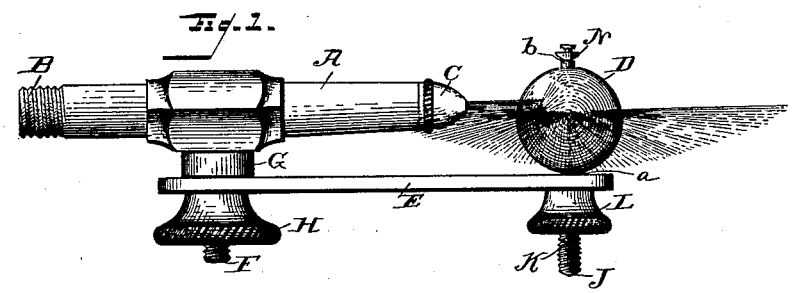
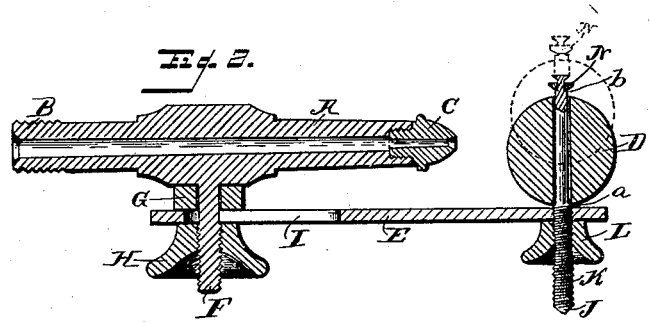
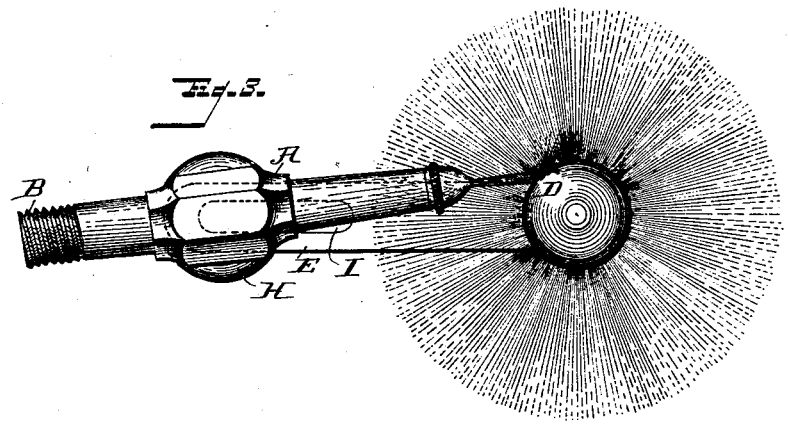
Witnesses
C. E. Hunt.
Alfred T. Gage.
Inventor
Edwin R. Keen,
by Wm. G. Henderson,
his Attorney

UNITED STATES PATENT OFFICE.

EDWIN R. KEEN, OF CHICAGO, ILLINOIS, ASSIGNOR TO THE WESTERN PUBLISHING HOUSE, OF SAME PLACE.

DEVICE FOR ATOMIZING OR SPRAYING LIQUIDS.

SPECIFICATION forming part of Letters Patent No. 475,452, dated May 24, 1892.

Application filed June 22, 1891. Serial No. 397,048. (No model.)

*To all whom it may concern:*

Be it known that I, EDWIN R. KEEN, a citizen of the United States, residing at Chicago, in the county of Cook and State of Illinois, have invented certain new and useful Improvements in Devices for Atomizing or Spraying Liquids; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to a device for spraying or atomizing water or other liquid, and is designed more particularly for lowering or cooling the temperature of a room or chamber wherein fruit, vegetables, or other substances liable to decay may be placed and be preserved for a longer period than under other conditions and their freshness preserved.

While the invention is particularly well adapted for lowering the temperature as specified, still it is not the intention to confine it to such use, as the invention will be the same although applied to other uses.

The invention has for its object to project the liquid against a rotatable body, so as to revolve said body at considerable speed, whereby as the liquid strikes the same the impact is sufficient to break the body of the liquid into fine spray or atoms, which are thrown off from the rotating body in radiating lines. The liquid is thus not only broken up into a fine spray or mist but is also thrown off by the rotating body and disseminated some distance therefrom, so that a more thorough distribution of the spray is obtained and a greater cooling effect produced.

The invention also has for its object to provide for the adjustment of the rotatable ball and the mouth of the spray-nozzle to and from each other, so that by bringing said parts nearer together the liquid will strike the ball with greater force and be broken up into a finer spray than when the two parts are adjusted farther apart. It will thus be seen that by adjusting said parts to or from each other a finer or a coarser spray is obtained, as circumstances or conditions may require.

The invention also has for its object to provide for moving the spray-nozzle or the rotatable ball in a curved line relatively to each other, so that the liquid may be projected against one side or the other of the ball, as desired, or nearer to or farther from a line passing directly through its center of rotation, whereby the direction in which the spray shall be first thrown from the rotatable ball is regulated and the speed at which the ball can be rotated is governed.

The invention has further for its object to provide for the vertical adjustment of the rotatable ball relatively to the mouth of the spray-nozzle, whereby the liquid is directed against the upper or the lower part of the ball, and the spray thus caused to shoot upward or downward, as desired.

To the accomplishment of the foregoing and such other objects as may hereinafter appear, the invention consists in the construction and also in the combination of parts hereinafter particularly described, and then specifically defined by the claims, reference being had to the accompanying drawings, forming a part of this specification, and in which—

Figure 1 is a side elevation of the spraying device or atomizer, showing the parts in position for projecting the liquid against one side of the rotatable ball. Fig. 2 is a longitudinal section taken in a vertical line through Fig. 1, but showing the rotatable ball-shaft in full lines. The dotted lines in said figure indicate the rotatable ball and its shaft in an elevated position. Fig. 3 is a plan view of the device, showing the parts in position for directing the liquid against the side of the ball opposite to that shown in Fig. 1 of the drawings.

In the drawings, the letter A designates a spray-nozzle, which may be of any desired form and size, and which is illustrated as provided at one end with screw-threads B for its attachment to a pipe or channel (not shown) for the transmission of the liquid from the source of supply to the nozzle. The nozzle is also illustrated as provided at its other end with a nipple C, threaded and screwed into the end of the nozzle, so that it can be removed when it is desired to have access to the interior of the nozzle for the purpose of removing obstructions therefrom or cleaning out the same.

Adjacent to the nipple or delivery end of the nozzle there is supported in some suitable way a rotatable body D. This body is formed so that it will present a practically continuous impinging surface at the point of impact of the water with it, and as a result the spray is practically the same at all times at the point of impact instead of the water being intermittently or unequally broken up into small particles, as where impelled or thrown off by paddles or blades. The preferred means for supporting this rotatable body is an arm or bracket E, which is preferably connected to the spray-nozzle by means of a stem F, projecting from said nozzle and passing through the arm E, there being a washer G between the arm and the nozzle, and a thumb-nut H on the threaded portion of the stem below the bracket, so that by screwing up said nut the bracket and nozzle will be held firmly together.

In order that the mouth of the nozzle and the rotatable ball may be capable of adjustment to and from each other, an elongated hole or slot I is formed in the bracket E, and through this slot the stem F passes. By loosening the thumb-nut H the bracket and nozzle may be adjusted relatively to each other, so that the rotatable ball will be brought closer or nearer to or removed farther from the delivery end of the nozzle, and thus the force with which the liquid shall strike against the ball is regulated, and the coarseness or fineness of the spray accordingly determined and controlled, it being understood that the nearer the ball is to the mouth of the nozzle the finer the spray produced, and the farther it is removed therefrom the coarser the spray produced.

It may be desirable at times to direct the liquid against the right-hand side of the ball and at other times against the left-hand side, as the position of the parts in relation to other objects about them may require, and at times it may be desirable to have the rotatable body turned or revolved at a higher speed than at other times, according as the spray is thrown a greater or less distance and with more or less force from the spraying device. I therefore provide for turning either the nozzle or the rotatable body, or both of them, in a curved line relatively to each other, so that the liquid from the nozzle will be projected against either the one side or the other of the rotatable body, as desired, and so that the liquid may be projected more or less to one side of a line drawn directly through the center of the nozzle and the center of rotation of the body, whereby the body may be caused to rotate at a higher or lower rate of speed, depending on the point of impact against the body, the nearer the point of impact being to the center line above referred to the lower the speed of rotation and consequently the shorter the distance the spray is thrown from the body, while the higher rate of speed and greater dissemination of the spray is attained by the impact point being farther from said line. This curved adjustment may be obtained by various constructions; but the preferred construction is by means of the stem F and thumb-nut H. By loosening the thumb-nut the spray-nozzle can be turned or the bracket can be turned, or both of them can be turned, so as to bring the parts into the position desired, and when the adjustment desired has been secured the parts will be held thereto by simply tightening the thumb-nut H, so as to clamp the parts in their adjusted position.

The vertical adjustment of the delivery end of the spray-nozzle and the rotatable body relatively to each other can be obtained in various ways; but the preferred way is the one which I have illustrated, and which consists in providing the lower portion of the shaft J, on which the rotatable body D is free to revolve with screw-threads K, which engage with threads in the opening in the arm or bracket E, through which the shaft J passes. Under such construction the rotatable body can be raised or lowered to the extent desired by simply turning the shaft on which it revolves and then by screwing up the thumb-nut L on the threaded end of the shaft until the nut bears against the arm E, the shaft and its ball will be held to their adjusted position. This adjustment allows the water to be projected against the upper or the lower portion of the ball, so that the spray will be deflected upward or downward, as desired, and according as the liquid is projected against the upper portion or lower portion of the rotatable body.

It will be observed that at the point where the screw-threads start on the shaft J there is a slight shoulder, which prevents the ball from dropping below that point. It will also be observed that there is a loose collar N on the upper portion of the shaft J above the ball D. This collar is allowed a limited vertical movement, so as to yield to the pressure of the rotatable body when it first strikes against the same, and thereby prevent binding of the body against the upper end of its shaft. The under surface of this collar is preferably of a rounding form, so as to reduce the extent of surface-contact between it and the ball, thereby lessening the friction. A shoulder b on the upper end of the shaft beneath the collar prevents the collar from resting normally on the top of the ball, and the flaring end of the shaft, as illustrated, will prevent the collar from being forced from off the shaft. By having the opening in the sliding collar N corresponding to the conical shape of the end of the shaft the collar may be pulled up in tight frictional contact with the conical end of the shaft, so as to make a frictional clutch, by which the shaft may be adjusted when it is desired to raise or lower the ball. Such details are not essential, but are described, since they may be used for a useful purpose. The rotating ball or body is preferably allowed a limited sliding movement on its shaft.

I have described with particularity the details of construction which I find best adapted to give the most satisfactory results; but I do not mean to restrict my invention to such details, as it is obvious that many changes can be made without departing from the spirit of my invention.

Having described my invention and set forth its merits, what I claim is—

1. An atomizer or spraying device composed of a liquid-supply pipe and a rotatable body having a practically continuous impinging surface at the point of impact of the water, supported in line with the discharge end of said pipe to receive the impact of the liquid issuing from said pipe, whereby said body is caused to rotate and the liquid is converted into a spray or vapor, substantially as and for the purposes described.

2. An atomizer or spraying device composed of a liquid-supply pipe, a rotatable body having a practically-continuous impinging surface at the point of impact of the water supported in line with the discharge end of said pipe to receive the impact of the liquid issuing from said pipe to spray or vaporize the liquid, and means for adjusting said pipe and body relatively to each other to increase or decrease the space between them and regulate the fineness of the spray of the liquid, substantially as and for the purposes described.

3. An atomizer or spraying device composed of a liquid-supply pipe, a rotatable body having a practically-continuous impinging surface at the point of impact of the water supported in line with the discharge end of said pipe to receive the impact of the liquid issuing from said pipe to spray or vaporize the liquid, and means for adjusting the position of said pipe and body relatively to each other in a horizontally-curved line, whereby the liquid from said supply-pipe may be projected against said body to one side of a vertical line drawn through the center of said body, substantially as and for the purposes described.

4. An atomizer or spraying device composed of a liquid-supply pipe, a rotatable body having a practically-continuous impinging surface at the point of impact of the water supported in line with the discharge end of said pipe to receive the impact of the liquid issuing from the pipe to spray or vaporize the liquid, and means for changing the relative vertical position of said pipe and body to each other to a point above or below a line drawn centrally and horizontally through said rotatable body, whereby the liquid may be projected against the upper or lower portion of said body to deflect the spray upward or downward, as desired, substantially as and for the purposes described.

5. An atomizer or spraying device composed of a liquid-supply pipe, the stem extending laterally therefrom, the arm through which said stem passes, the rotatable body supported by said arm in line with the discharge end of said supply-pipe, and means for securing said arm and supply-pipe together, substantially as and for the purposes described.

6. An atomizer or spraying device composed of the liquid-supply pipe, the adjustable shaft carrying the rotatable body in line with the discharge end of said supply-pipe, a support to said shaft, and means for holding said shaft to its adjustment, substantially as and for the purposes described.

7. An atomizer or spraying device composed of a liquid-supply pipe, a supporting-arm connected therewith and having both a longitudinal and lateral adjustment, and a rotatable body supported by said arm in line of the discharge end of said pipe, substantially as and for the purposes described.

In testimony whereof I affix my signature in presence of two witnesses.

EDWIN R. KEEN.

Witnesses:
IDA E. JOY,
Mrs. A. L. STOKES.